United States Patent
Pernitsky

(10) Patent No.: US 12,292,028 B2
(45) Date of Patent: May 6, 2025

(54) ROOT ASSEMBLY OF A WIND TURBINE BLADE FOR A WIND TURBINE, WIND TURBINE BLADE AND WIND TURBINE

(71) Applicant: Siemens Gamesa Renewable Energy A/S, Brande (DK)

(72) Inventor: Cole Campbell Pernitsky, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/574,551

(22) PCT Filed: May 31, 2022

(86) PCT No.: PCT/EP2022/064786
§ 371 (c)(1),
(2) Date: Dec. 27, 2023

(87) PCT Pub. No.: WO2023/280476
PCT Pub. Date: Jan. 12, 2023

(65) Prior Publication Data
US 2024/0318626 A1 Sep. 26, 2024

(30) Foreign Application Priority Data
Jul. 5, 2021 (EP) .................................... 21183733

(51) Int. Cl.
*F03D 1/06* (2006.01)
(52) U.S. Cl.
CPC ......... *F03D 1/0675* (2013.01); *F03D 1/0658* (2013.01); *F05B 2260/30* (2013.01)

(58) Field of Classification Search
CPC ............ F05B 2260/30; F05B 2260/301; F05B 2240/302
See application file for complete search history.

(56) References Cited

U.S. PATENT DOCUMENTS

| 7,517,194 B2* | 4/2009 | Doorenspleet | ........ F03D 1/0658 |
| | | | 416/239 |
| 2003/0205011 A1* | 11/2003 | Bequet | ..................... F16B 5/01 |
| | | | 52/282.1 |

(Continued)

FOREIGN PATENT DOCUMENTS

| EP | 1238196 A2 | 9/2002 |
| EP | 3839246 A1 | 6/2021 |

OTHER PUBLICATIONS

Ubaid et al., Strength prediction and progressive failure analysis of carbon fiber reinforced polymer laminate with multiple interacting holes involving three dimensional finite element analysis and digital image correlation, International Journal of Damage Mechanics, 23(5):609-635, 2014. ISSN 15307921. doi: 10. 1177/ 1056789513504123; 2014.

(Continued)

*Primary Examiner* — Courtney D Heinle
*Assistant Examiner* — Ryan C Clark
(74) *Attorney, Agent, or Firm* — Schmeiser, Olsen & Watts LLP

(57) ABSTRACT

The following relates to a root assembly of a wind turbine blade for a wind turbine. The following further relates to a wind turbine blade including the root assembly and a wind turbine including the wind turbine blade.

13 Claims, 8 Drawing Sheets

(56) References Cited

U.S. PATENT DOCUMENTS

| | | | |
|---|---|---|---|
| 2007/0231146 A1* | 10/2007 | Birkemeyer | F03D 1/0658 416/204 R |
| 2007/0253819 A1 | 11/2007 | Doorenspleet et al. | |
| 2009/0263250 A1* | 10/2009 | Quell | F03D 1/0658 416/204 R |
| 2010/0124474 A1* | 5/2010 | Jacobsen | F16B 37/047 290/55 |
| 2012/0148404 A1 | 6/2012 | Quell et al. | |
| 2014/0334934 A1* | 11/2014 | Kannenberg et al. | F03D 1/0675 416/217 |
| 2015/0159624 A1* | 6/2015 | Haahr | F03D 1/0658 29/889.7 |

OTHER PUBLICATIONS

Schubel et al., Wind turbine blade design, In Wind Turbine Technology: Principles and Design, vol. 36, pp. 1-34. 2014. ISBN 9781482244953. doi: 10.1201/b16587; 2014.

Solis et al., Analysis of damage and interlaminar stresses in laminate plates with interacting holes, International Journal of Mechanical Sciences, 165:105189, 2020. ISSN 00207403. doi: 10.1016/j.ijmecsci. 2019.105189.; 2020.

Chutima et al., Effect of pitch distance, row spacing, end distance and bolt diameter on multi-fastened composite joints, Composites Part A: Applied Science and Manufacturing, 27(2):105-110, Jan. 1996. ISSN 1359835X. doi: 10.1016/1359-835X(95)00020-3.; 1996.

Persson et al., Fatigue of multiple-row bolted joints in carbon/epoxy laminates: Ranking of factors affecting strength and fatigue life, International Journal of Fatigue, 21(4):337-353, 1999. ISSN 01421123. doi: 10.1016/S0142-1123(98)00081-4.

Soutis et al., Hole-hole interaction in carbon fibre/epoxy laminates under uniaxial compression, Composites, 22 (1):31-38, 1991. ISSN 00104361. doi: 10.1016/0010-4361(91)90100-U.; 1991.

PCT International Search Report and Written Opinion of International Searching Authority mailed Aug. 25, 2022 corresponding to PCT International Application No. PCT/EP2022/064786 filed May 31, 2022.

\* cited by examiner

ROOT ASSEMBLY OF A WIND TURBINE BLADE FOR A WIND TURBINE, WIND TURBINE BLADE AND WIND TURBINE

CROSS-REFERENCE TO RELATED APPLICATIONS

This application claims priority to PCT Application No. PCT/EP2022/064786, having a filing date of May 31, 2022, which claims priority to EP Application No. 21183733.1, having a filing date of Jul. 5, 2021, the entire contents both of which are hereby incorporated by reference.

FIELD OF TECHNOLOGY

The following relates to a root assembly of a wind turbine blade for a wind turbine, a wind turbine blade and a wind turbine.

BACKGROUND

Wind turbine blades are typically attached to the hub via one of two connection methods: T-bolts or root inserts. By means of these connection methods, large loads from the wind turbine blades to the hub must be transferred. The industry trend towards longer turbine blades increases these loads so that stronger roots are needed.

Root assemblies referred to herein are understood as an assembly comprising a root portion of a wind turbine blade connected to a bearing or a hub flange of the hub of the wind turbine. As explained above, typically, the bearing or hub flange is connected to the root portion of the wind turbine blade by means of multiple T-bolts, that is bolts secured within bushings (see FIG. 2), or by means of root inserts introduced into the laminate material of the root portion.

To resist the very high loads in large wind turbines having long wind turbine blades, a large number of bolts and bushings or inserts needs to be provided in the root assembly.

However, the space for the bolts and bushings or inserts on a common circumference of the root portion is limited. Therefore, it is known to provide the root assembly with a staggered configuration of the multiple bolts to increase the so-called root capacity, which relates to the number of T-bolts in a root assembly.

However, the root portions, in particular when having a staggered configuration of bolts, still experience large strain and are therefore susceptible to failure.

SUMMARY

Accordingly, an aspect relates to provide an improved root assembly, wind turbine blade and wind turbine not having the previously described disadvantage, in particular having a long service life.

According to a first aspect of embodiments of the invention, the aspect is solved by a root assembly of a wind turbine blade for a wind turbine. A root portion of the root assembly comprises a root segment. A root attachment face of the root portion is attached to a bearing or a hub flange of the root assembly by means of multiple bolts. Each of the multiple bolts is connected to one of multiple bushings fixedly arranged within the at least one root segment such that the multiple bolts are arranged adjacent to each other along a circumference of the root portion, and the bushings are arranged adjacent to each other along the circumference of the root portion. Adjacent bushings are offset from one another in a way such that adjacent bushings are provided at an axial distance from one another, the axial distance being measured in an axial direction from the root attachment face to the bushings (or, in other words, towards the tip of the blade) and between centers of the adjacent bushings. A quotient between the axial distance and a bushing diameter of the bushings is 2.5 or greater.

The combination of bolt and bushing is commonly referred to as a T-bolt. In particular, the bolts may have threads on an outer circumference thereof. By means of these outer threads, they may be interlocked with inner threads of the bushings. By means of the axial spacing of adjacent bushings, a so-called staggered configuration of T-bolts may be achieved. The staggered configuration of T-bolts is characterized by adjacent bushings being spaced apart from one another in the axial direction or, in other words, being alternatingly located at different distances from the root attachment surface. Accordingly, adjacent bolts alternatingly have a different length to realize the staggered configuration. The staggered configuration allows an increase of root capacity without increasing the spacing in the circumferential direction of the root segment. However, the staggered configuration still has some drawbacks. In particular, a root segment having a quotient between the axial distance and a bushing diameter of the bushings of 2.3 or less results in a high strain profile that is disadvantageous with respect to the service life of the wind turbine blade.

A lateral spacing in a circumferential direction of the root segments between bolts is typically set by external parameters, however, the axial distance or, in other words, axial spacing between the centers of the bolts or cavities, in which the bolts are fitted, can be easily adjusted. By changing the axial distance in dependence to the bushing diameter as described herein, the strain in the laminate of the root portion can be reduced. Thereby, the distance between two staggered rows of bolts may be optimized to a region of optimal strain reduction. Accordingly, a root bolt pattern using alternating near and far bolts may be implemented. Or, in other words, a root bolt pattern having inner bolts located in a first staggered row and outer bolts in a second staggered row, with an axial distance between the rows being according to a quotient between the axial distance and bushing diameter of the bushings of at least 2.5, may be implemented. For calculating the quotient, it is sufficient to calculate the quotient based on the axial distance of merely one pair of adjacent bushings with respect to one bushing diameter of one bushing of this pair of adjacent bushings. However, most or all of the bushings have the same diameter. Also, the axial distance between adjacent bushings is the same for most or all pairs of adjacent bushings.

Depending on the design of the wind turbine blade, the root portion may comprise one or more root segments. For example, in a butterfly design of a wind turbine blade, the root portion typically consists of two root segments. In an integral design of a wind turbine blade, the root portion may consist of multiple root segments joined together at respective root segment interfaces. The root segments may in particular have a round shape, i.e., be rounded and moreover in particular have a partially circular or elliptical shape. In other words, the root segments may form an arc or have an arc shape. The root segments may have equal or different arc lengths among them. Thereby, a cylindrically shaped root portion of the wind turbine blade may be provided. The cross section of the root portion may have a circular or an elliptical shape. The root segments may be reinforcement blocks (such as pre-cured laminate blocks) that are placed on or within a shell laminate of the wind turbine blade during manufacture of the shell, or they may simply be reinforced areas of the shell constructed by additional layers placed and cured together with the rest of the shell. The root segments may be manufactured from a fiber composite material, in particular a fiber composite lay-up. Accordingly, the material of the root segment may also be referred to as a laminate. The fiber composite material may have glass fibers and/or carbon fibers, for example.

The quotient between the axial distance and the bushing diameter of the bushings may be in the range of 2.5 to 5. More desirably, the quotient between the axial distance and the bushing diameter of the bushings may be within the range of 2.7 to 4.8. And even more desirably, the quotient between the axial distance and the bushing diameter of the bushings may be within the range of 3 to 4.5 or 3.5 to 4.5. This quotient range has been found to be optimal for the laminate of the root segment to become able to carry a higher load, and for the root portion having the root segment or root segments thereby becoming able to support a longer wind turbine blade, and for spacing the bushings closer together, allowing for more bolts around the circumference of the root portion, which also allows for stronger and/or longer wind turbine blades.

The root segment may have a first centerline located in the center of a thickness of the root segment measured along a radial direction of the root segment and extending along a circumferential direction of the root segment. The multiple bolts may be arranged with their centers along a second centerline extending along the circumferential direction of the root segment. The second centerline may be offset from the first centerline. By offsetting the second centerline from the first centerline, whereby the bolts are shifted away from the thickness center of the root segment either towards the inside or the outside of the wind turbine blade, the strain profile through the thickness of the wind turbine blade can be equalized. This equalization also comes with a reduction in strain that can be used to increase the root capacity defined by the maximum load that the root portion can carry, which relates to the number of bolts placed in the root portion. In this regard, the centerlines represent geometric lines that can be drawn in the root assembly to determine the offset. In particular, a radial distance may be measured between both centerlines indicating the amount or size of the offset. The centerlines must not actually be drawn or be visible in the root assembly but merely be imaginary or drawable by the instruction given herein, meaning that the first centerline is drawn in the center of the thickness of the root segment measured along the radial direction of the root segment and extending along the circumferential direction of the root segment and the second centerline is drawn through the centers of the bolts or cavities, in which they are inserted, along the circumferential direction of the root segment.

In particular, the second centerline may be offset from the first centerline in a direction towards an inside of the root portion. This is advantageous because past the bushings and towards the blade tip of the wind turbine blade, the thickness of the root portion is reduced through a tapered geometry to transition from the root region to the shell of the wind turbine blade. This tapering offsets the first centerline towards the outer surface of the wind turbine blade, and subsequently, the point at which the root portion is loaded differs between the hub and tip ends. The result of this is that the outer surface of the wind turbine blade carries more load and thus more strain. This strain bias through the laminate is disadvantageous because the material is not loaded evenly. By offsetting the second centerline towards the inside of the root portion or, in other words, towards the center (radially) of the root portion or wind turbine blade, the strain bias can be compensated for so as to reduce the strain on the outer surface and provide the above-mentioned equalization of strain in the wind turbine blade.

Further, the second centerline may be offset from the first centerline by less than 15%, in particular less than 10%, of the thickness of the root segment. It has been found that a radial offset larger than that is detrimental to equalizing the strain profile of the wind turbine blade.

Moreover, the second centerline may be offset from the first centerline by 0.5% to 5% in particular 1% to 3%, of the thickness of the root segment. The equalization of the strain profile through the laminate of the wind turbine blade and the reduction in overall strain in the root portion has been found to be most preferential in this area.

Also, it may be provided that the first centerline extends through the multiple bolts. In this case, the first centerline does not extend through the centers of the bolts but offset from their centers and still close enough to the second centerline such that the first centerline extends through the bolts. In this case, the radial distance between the two centerlines cannot be greater than half of the diameter of the bolts or cavities, in which they are inserted.

It may be provided that at least half or more than half, at least two-thirds or more than two-thirds or all of the multiple bolts of the root assembly are arranged with their centers along the second centerline. Accordingly, there may only be one row of bolts on the root attachment face along which the bolts are introduced into the root segment. The provision of, for example, two or more rows of bolts at the root attachment face would introduce further strain between the bolts and can thereby be avoided.

The multiple bolts may have a first length or a second length, wherein the second length is greater than the first length, and wherein the bolts of the multiple bolts having the first length and the bolts of the multiple bolts having the second length are alternatingly connected to the adjacent offset bushings. The multiple bolts may be secured against the bearing or the hub flange by means of nuts. This is a particularly simple and easy way of securing the bearing or hub flange to the root portion.

According to a second aspect of embodiments of the invention, a wind turbine blade comprises the root assembly according to the first aspect of embodiments of the invention.

According to a third aspect of embodiments of the invention, a wind turbine comprises at least one wind turbine blade according to the second aspect of embodiments of the invention.

The wind turbine may be a direct drive wind turbine or a geared wind turbine, for example. Further, the at least one wind turbine blade may be mounted on an outer ring of a pitch bearing of the wind turbine or on an inner ring of the pitch bearing.

BRIEF DESCRIPTION

Some of the embodiments will be described in detail, with reference to the following figures, wherein like designations denote like members, wherein.

Figure 5:
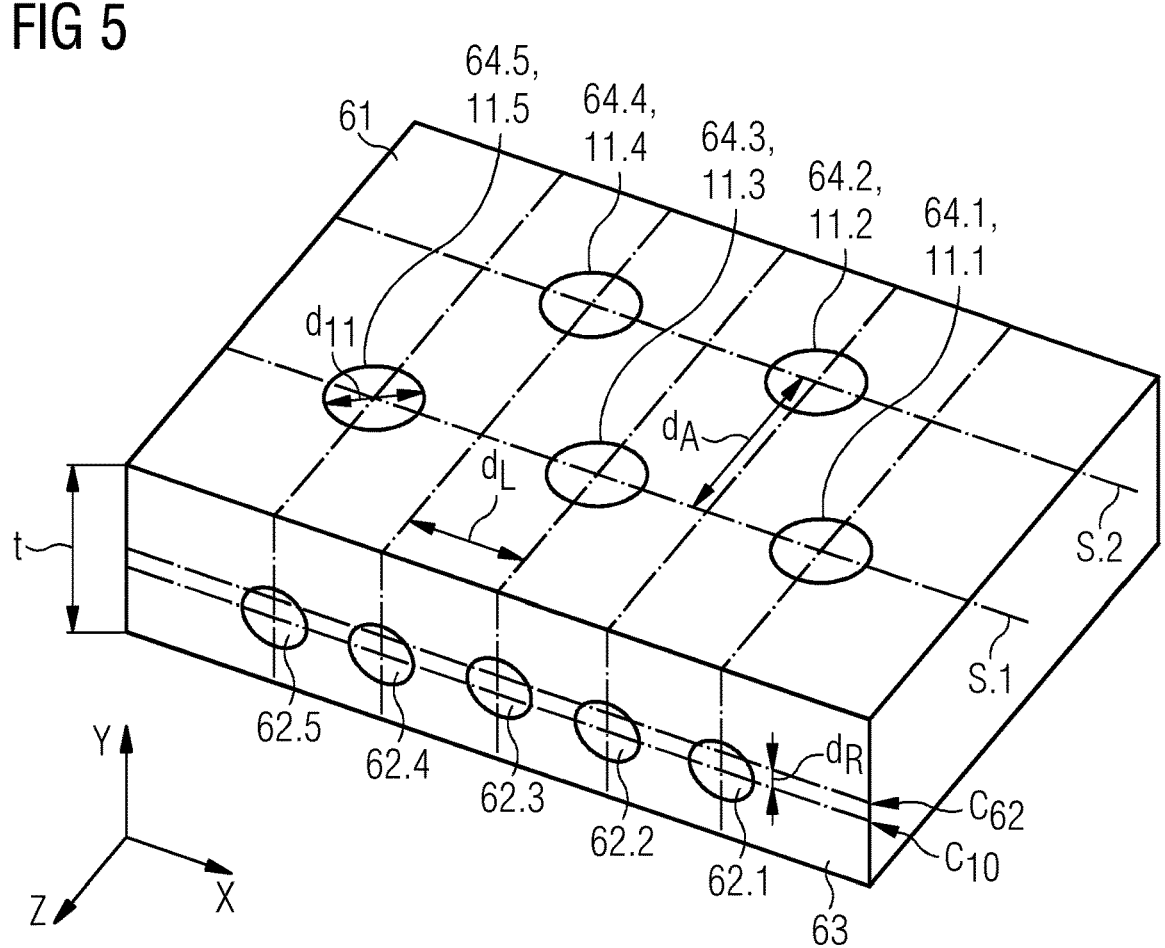
FIG. 5 shows a perspective view on a part of a root segment of the root assembly of FIG. 4.
Figure 12:
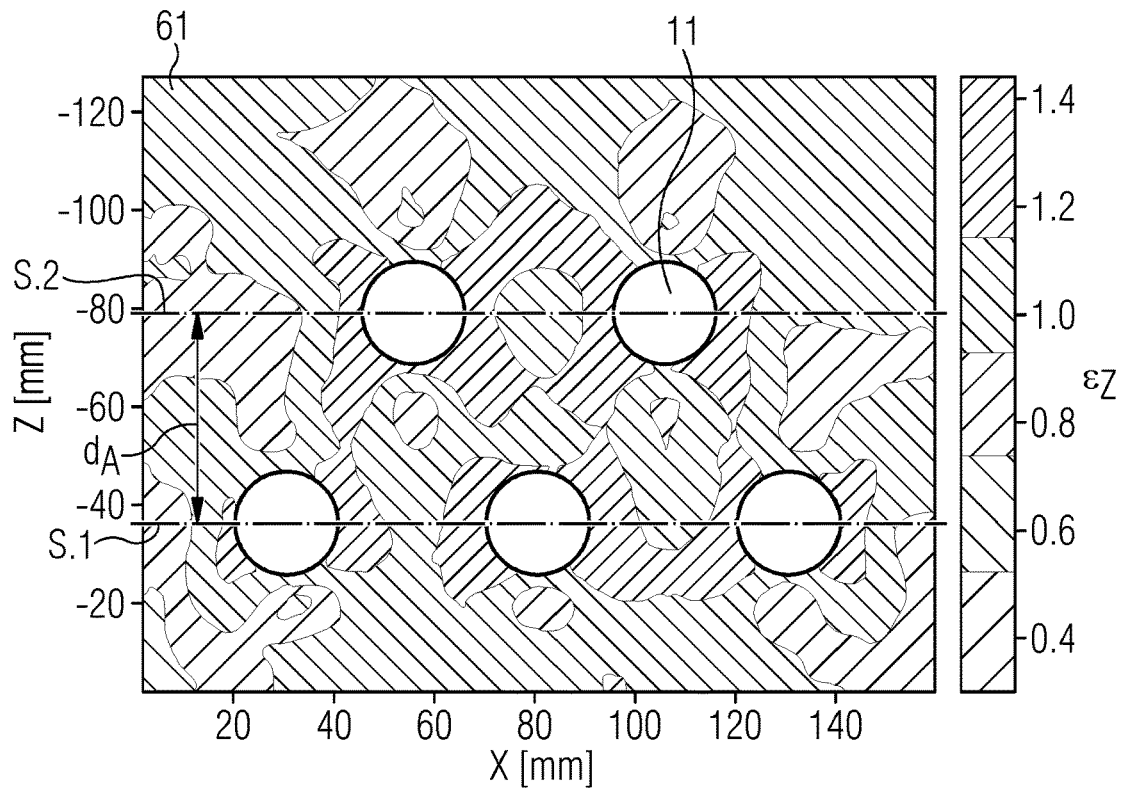
Figure 13:
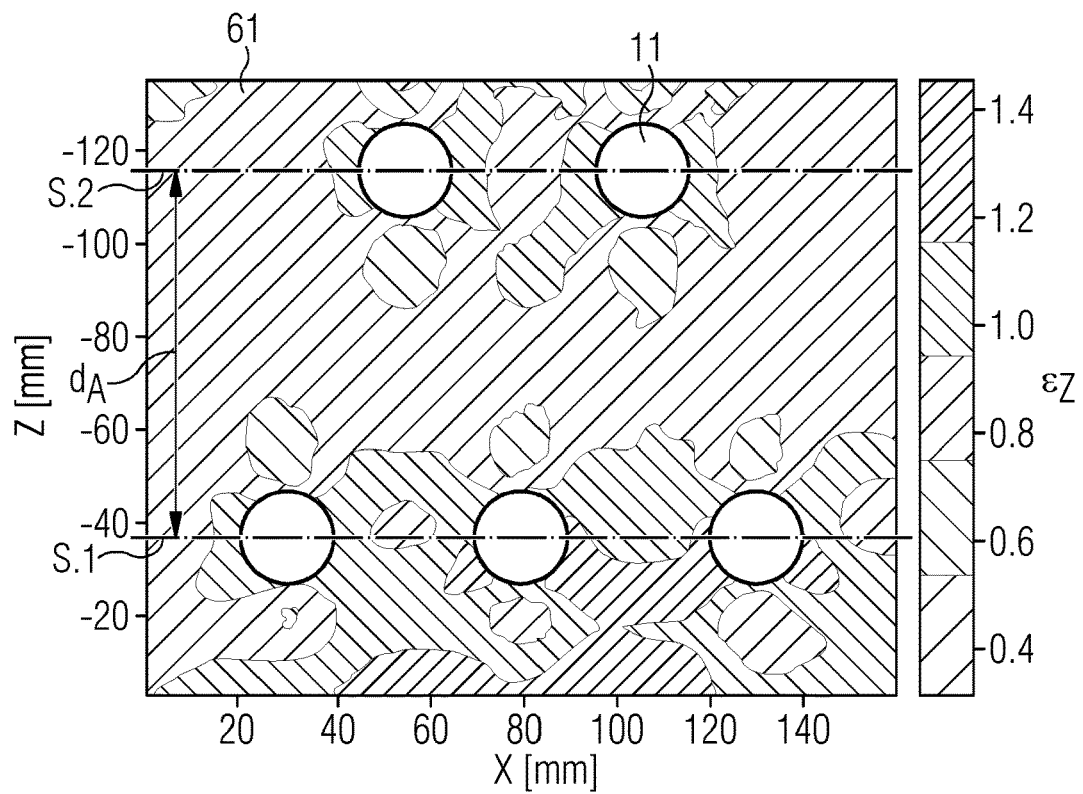

FIG. 12 shows a top view on a strain contours representation of the part of the root segment of FIG. 5 having as design parameter a first quotient between the axial distance of bushings and the bushing diameter; and FIG. 13 shows a top view on a strain contours representation of the part of the root segment of FIG. 5 having as design parameter a second quotient between the axial distance of bushings and the bushing diameter.

DETAILED DESCRIPTION

Figure 1:
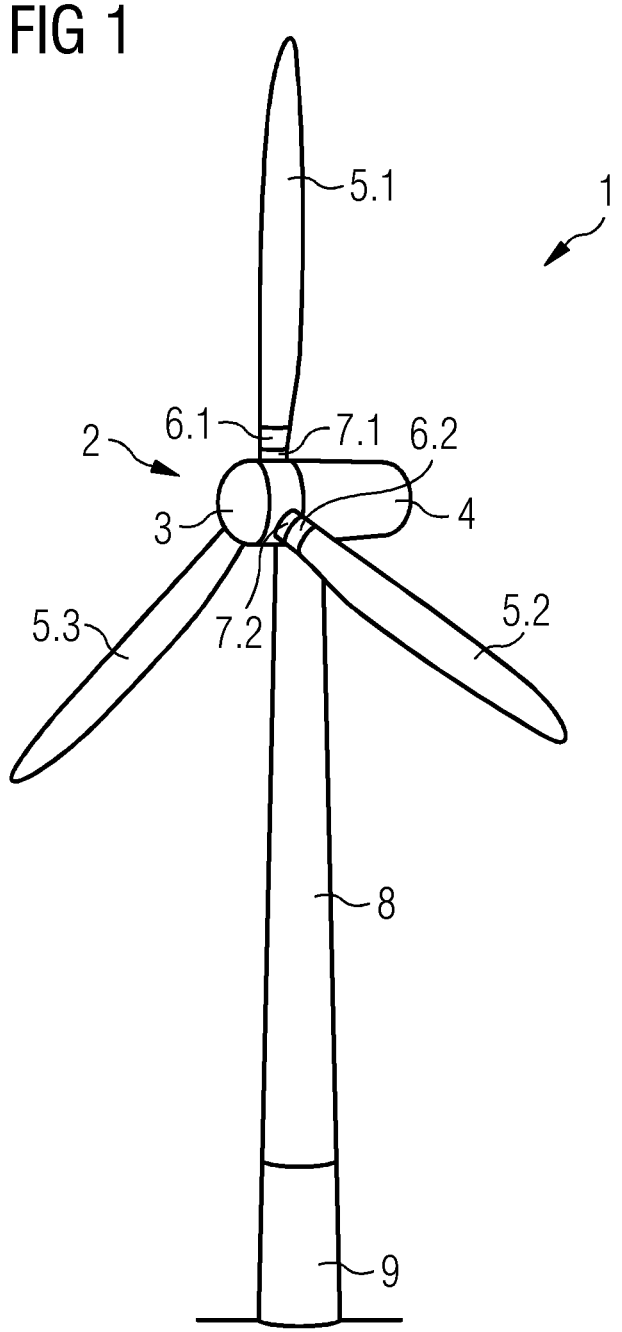
FIG. 1 shows a side perspective view on a wind turbine.

FIG. 1 shows a wind turbine 1 according to an embodiment of the invention. The wind turbine 1 comprises a rotor 2 having three wind turbine blades 5.1, 5.2, 5.3 connected to a hub 3. However, the number of wind turbine blades 5 may be at least one wind turbine blade 5, two wind turbine blades 5 or more than three wind turbine blades 5 and chosen as required for a certain setup of a wind turbine 1.

The hub 3 is connected to a generator (not shown) arranged inside a nacelle 4. During operation of the wind turbine 1, the wind turbine blades 5 are driven by wind to rotate, and the wind's kinetic energy is converted into electrical energy by the generator in the nacelle 4.

The nacelle 4 is arranged at the upper end of a tower 8 of the wind turbine 1. The tower 8 is erected on a foundation 9 such as a monopile or tripile. The foundation 9 is connected to and/or driven into the ground or seabed.

Each of the wind turbine blades 5.1, 5.2, 5.3 has a root portion 6.1, 6.2. These root portions 6.1, 6.2 are connected to the hub 3 by means of bearings 7.1, 7.2 or hub flanges 7.1, 7.2. In this particular view, the root portion 6 and bearing 7 or hub flange 7 of the wind turbine blade 5.3 is covered by the hub 3.

Figure 2:
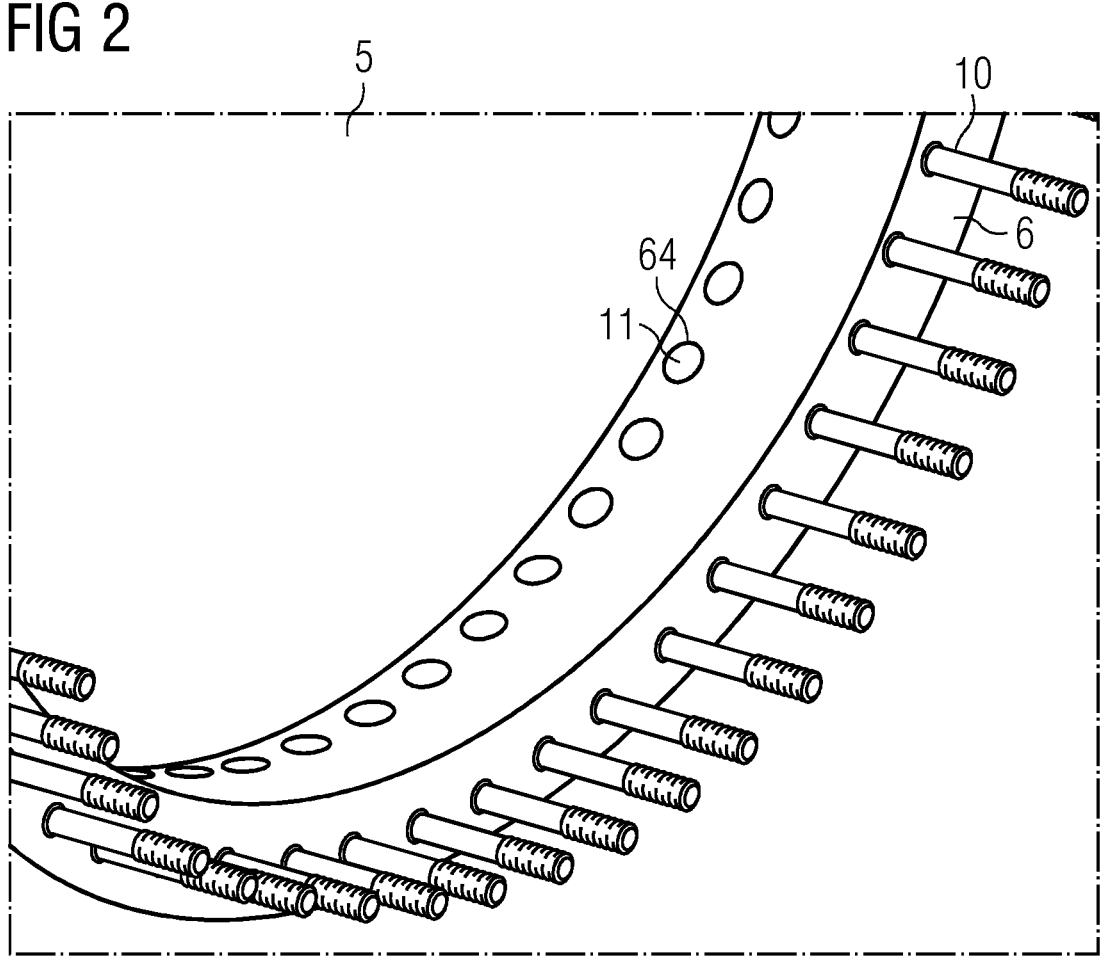
FIG. 2 shows a side perspective view on a part of a root portion of a wind turbine blade according to a first embodiment.

FIG. 2 shows a side perspective view on a part of a root portion 6 of a wind turbine blade 5 according to a first embodiment. Multiple bolted connection means in the form of bushings 11 are arranged within cavities 64 located in the root portion 6 along the circumference of it. Bolts 10 are attached to the bushings 11. The bolts 10 may be attached to a hub flange 7 or bearing 7 as shown in FIG. 1. As an alternative to the arrangement of the bushings 11 in a single row along the root portion 6 as shown in FIG. 2, a second embodiment shown in FIG. 4 realizes a staggered configuration of the bolts 10 and bushings 11 and will be explained in more detail with reference to FIG. 4.

Figure 3:
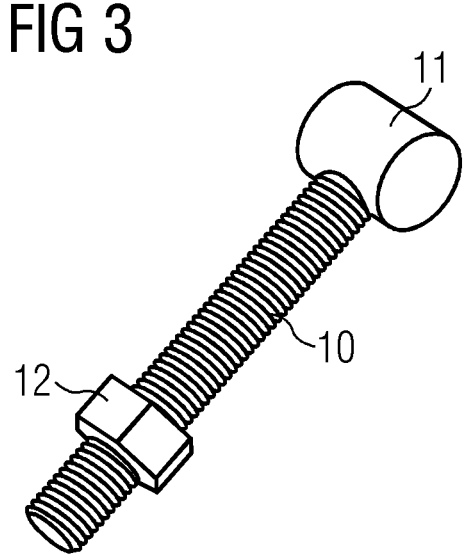
FIG. 3 shows a side perspective view on a T-bolt.

FIG. 3 shows a side perspective view on a bolt 10 with a bushing 11, generally referred to as a T-bolt when assembled together, and a nut 12. The bushing 11 has a cylindrical shape so as to positively fit into the cavities 64. It may be placed in corresponding cavities 64 within the root portion 6, as can be seen in FIG. 2. When the bolt 10 is secured by means of the bushing 11 within the root portion 6, and the hub flange 7 or bearing 7 is attached thereto, the root portion 6 may be secured to the hub flange 7 or bearing 7 by means of the nut 12.

Figure 4:
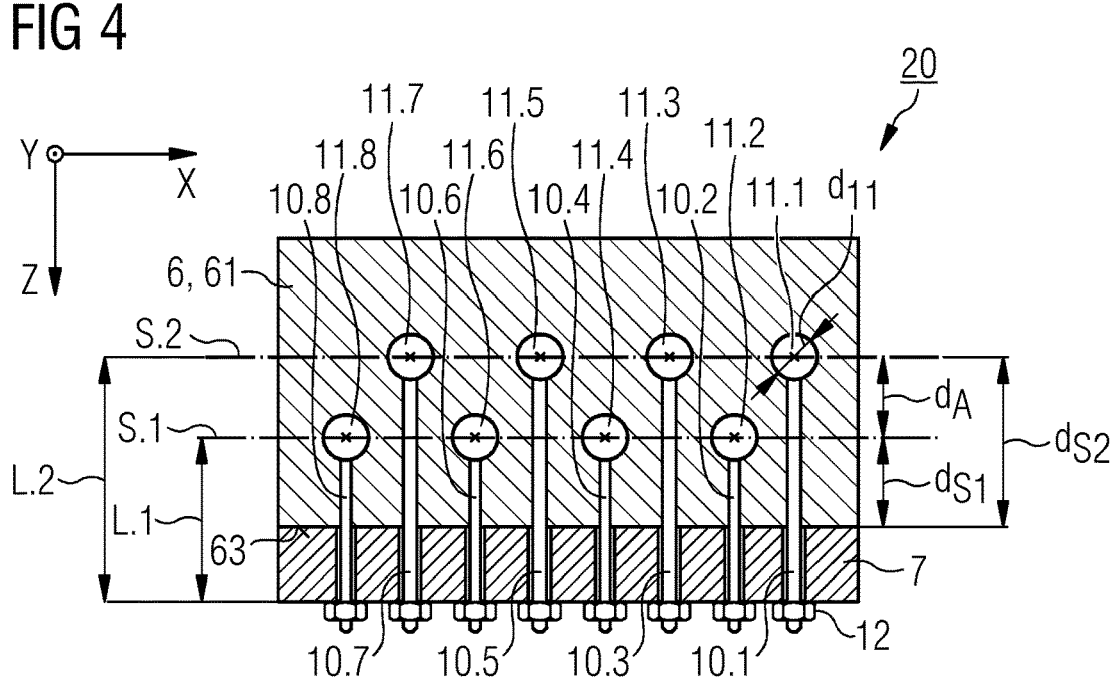
FIG. 4 shows a cross-section view on a part of a root assembly of a wind turbine blade according to a second embodiment.

FIG. 4 shows a cross-section view on a part of a root assembly 20 of a wind turbine blade according to a second embodiment. In FIG. 4, the root portion 6 is only shown with one root segment 61. However, depending on the design of the wind turbine blade 5, the root portion 6 may comprise two or more root segments 61. For example, in a butterfly design of a wind turbine blade 5, the root portion 6 typically consists of two root segments 61. In an integral design of a wind turbine blade 5, the root portion 6 may consist of multiple root segments 61 joined together at respective root segment interfaces. All root segments 61 of the root portion 6 of the wind turbine blade 5 may be designed as explained below with reference to FIG. 4 and the further figures of the drawings.

The root segment 61 shown in FIG. 4 comprises multiple staggered bushings 11.1 . . . 11.8 such that respectively adjacent bushings 11.1 . . . 11.8 are alternately located at two different distances $d_{S1}$ and $d_{S2}$ from a root attachment surface 63, at which the root portion 6 with its root segment 61 is attached to the bearing 7 or hub flange 7. The distances $d_{S1}$ and $d_{S2}$ of the bushings 11.1 . . . 11.8 are measured from the centers of the bushings 11 to the root attachment face 63 in the Z direction indicated in the coordinate system with coordinates X, Y, Z depicted in FIG. 4. The Z direction corresponds to a longitudinal or axial direction of the root portion 6 or wind turbine blade 5. The Y direction corresponds to a radial direction or thickness direction of the root portion 6, along which its thickness t may be measured (see FIG. 5). And the X direction corresponds to a circumferential direction along which the circumference of the root portion 6 or wind turbine blade 5 may be measured.

By means of the two different distances $d_{S1}$ and $d_{S2}$ of the bushings 11.1 . . . 11.8 from the root attachment face 63, the multiple bolts 10.1 . . . 10.8 are staggered, such that the bolts 10.1 . . . 10.8 alternatingly have a first length L.1 and a second length L.2, the first length L.1 being smaller than the second length L.2. Each of the bolts 10.1 . . . 10.8 is secured within the root segment 61 by means of a nut 12, thereby securing the bearing 7 or hub flange 7 to the root segments 61 and root portion 6 and securely fastening the wind turbine blade 5 having the root portion 6 to the hub 2 of the wind turbine 1.

As seen in FIG. 4, the adjacent bushings 11.1 . . . 11.8 alternatingly extend along a first staggered row S.1 and a second staggered row S.2. The staggered rows S.1, S.2 extend through centers of the bushings 11.1 . . . 11.8 while running perpendicular to the Z direction or, in other words, running in the X direction. An axial distance $d_A$ between the staggered rows S.1, S.2 or the centers of each one of the adjacent bushings 11.1 . . . 11.8 may be measured in the Z direction. The axial distance $d_A$ indicates the distance or spacing between two adjacent bushings 11.1 . . . 11.8 having the different distances $d_{S1}$ and $d_{S2}$ from the root attachment surface 63. Note that the axial distance $d_A$ is not the shortest distance between two adjacent ones of the bushings 11.1 . . . 11.8 but is measured in the Z direction or, in other words, perpendicular to the root attachment face 63 and from the center of one bushing 11 to the center of the other bushing 11. FIG. 4 further indicates a diameter $d_{11}$ of the bushings 11.1 . . . 11.8 at exemplary bushing 11.1. All bushings 11.1 . . . 11.8 have the same diameter $d_{11}$.

FIG. 5 shows a part of the root portion 61 in a perspective view not yet having the bolts 10 and bushings 11 inserted therein so as to connect to the hub flange 7 or bearing 7. Indicated are once again the staggered rows S.1, S.2 and the axial distance $d_A$ measured between the two rows S.1, S.2 or, in other words, centers of adjacent bushings 11.1 . . . 11.5. The adjacent bushings 11.1 . . . 11.5 are not shown in FIG. 5, instead their positions in respective cavities 64.1 . . . 64.5 configured for receiving the bushings 11.1 . . . 11.5 are shown. The centers of the cavities 64.1 . . . 64.5 correspond to the centers of the bushings 11.1 . . . 11.5.

Besides the axial distance $d_A$, a further design parameter may be measured in the form of a lateral distance or spacing $d_L$ between adjacent bushings 11.1 . . . 11.5 or cavities 64.1 . . . 64.5, which is shown in FIG. 5. The lateral distance $d_L$ is measured between the centers of adjacent bushings 11.1 . . . 11.5 in the X direction, i.e., parallel to the root attachment face 63.

At the root attachment face 63, the respective cavities 62.1 . . . 62.5 configured for receiving the bolts 10 may be seen. Also, the root segment 61 may be seen with its entire above-mentioned thickness t. At half of the thickness t of the root segment 61 or, in other words, at the center or middle of the root segment 61 along its extension in the Y direction, a first centerline $C_{62}$ may be drawn running along the circumferential direction X. This first centerline $C_{62}$ separates the surface of the root attachment face 63 into two equally sized surfaces.

A second centerline $C_{10}$ may be drawn extending in the circumferential direction X and in parallel to the first centerline $C_{62}$. This second centerline $C_{10}$ connects the centers of the adjacent bolts 10 or centers of the cavities 62.1 . . . 62.5 configured for receiving the bolts 10. In other words, the bolts 10 or cavities 62.1 . . . 62.5 are (radially) offset with their centers from the (thickness) center or middle of the root segment 61. This radial offset is defined by a radial distance $d_R$ measurable between the two centerlines $C_{10}$, $C_{62}$ in the radial direction Y.

Generally, a laminate of the wind turbine blades 5 must include the above-described cavities 62, 64 for the T-bolts formed by the bolts 10 and bushings 11. These cavities 62, 64 create stress concentrations which are magnified the closer together the cavities 62, 64 are spaced together. A root capacity of the root portion 6 defined by the maximum load that the root portion 6 may carry is thus linked to the placement of the T-bolts around the root circumference, and stronger root portions 6 often need larger diameters to fit more bolts 10. Larger root diameters require larger hubs 2, and the production of a larger hub 2 is very expensive. Therefore, there is considerable interest in increasing root capacity without increasing the diameter of the root portion 6.

To increase the root capacity without also requiring an increase of the diameter of the root portion 6, the design of the root assembly 20 shown in FIG. 4 is improved by means of optimal choice of the above-identified design parameters, in particular axial distance $d_A$, bushing diameter $d_{11}$ and/or radial distance $d_R$. This is explained in the following in more detail.

Figure 6:
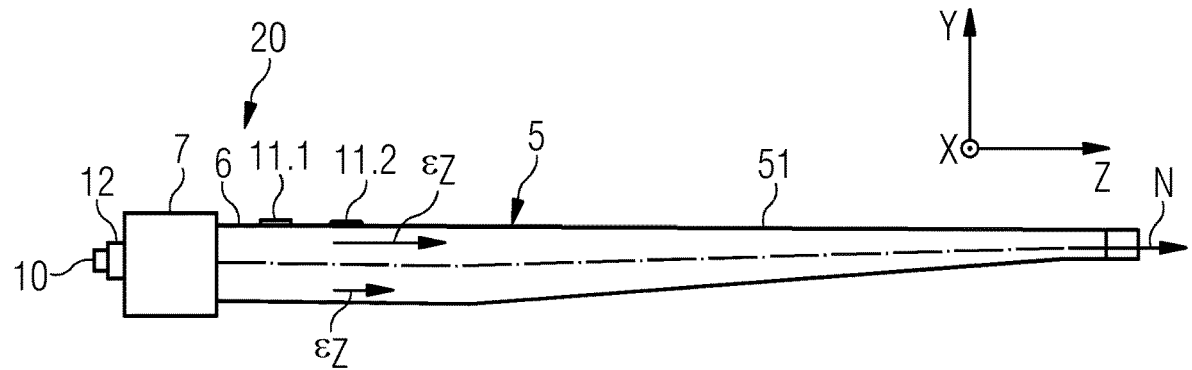
FIG. 6 shows a side sectional view on a part of the wind turbine blade having the root assembly of FIG. 4.

FIG. 6 shows a side sectional view on a part of a wind turbine blade 5 having the root assembly 20 of FIG. 5. Past the bushings 11.1, 11.2 towards a tip of the wind turbine blade 5, a thickness of the wind turbine blade 5 is reduced through a tapered geometry to transition from the root portion 6 to a shell 51 of the wind turbine blade 5. This tapering offsets a plane of the first centerline $C_{62}$ towards the outer surface of the blade 5, and subsequently, the point at which the root portion 6 is loaded differs between the hub 2 and tip end of the wind turbine blade 5. This may be seen from FIG. 6, where the applied load N is closer to the outer surface of the wind turbine blade 5 than the bolt 10. The result of this is that the outer surface of the wind turbine blade 5 carries more load and therefore experiences more strain. This strain bias through the laminate of the wind turbine blade 5 is disadvantageous because the laminate material is not loaded evenly.

The radial offset between the two centerlines $C_{10}$, $C_{62}$ shifts the cavities 62 and thereby the bolts 10 away from the outer blade surface and towards the inside or center of the root portion 6. By means of this shift, the strain profile through the thickness of the wind turbine blade 5 can be equalized. This equalization also comes with a reduction in strain that can be used to increase the root capacity.

Figure 7:
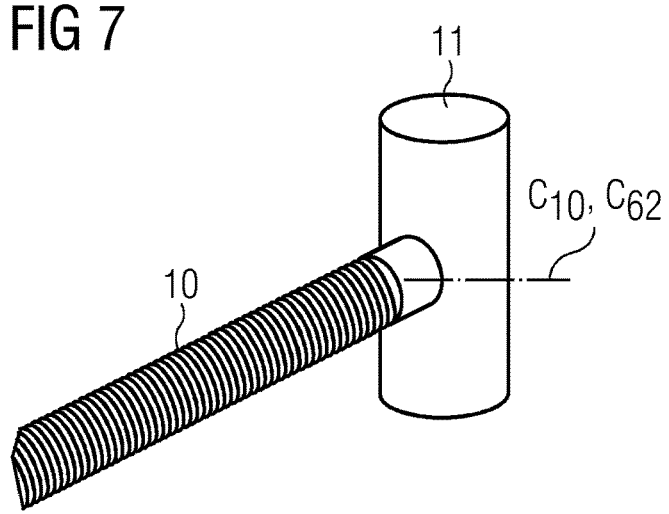
FIG. 7 shows a perspective view on a part of a T-bolt according to a design as generally used in the art.

FIG. 7 shows a perspective view on a part of a T-bolt according to a design as commonly used in the art. This T-bolt is designed symmetrically. This means that the bolt 10 is attached to the bushing 11 at a center or middle of the bushing 11. In this symmetric design of the T-bolt, a radial offset is not foreseen.

Figure 8:
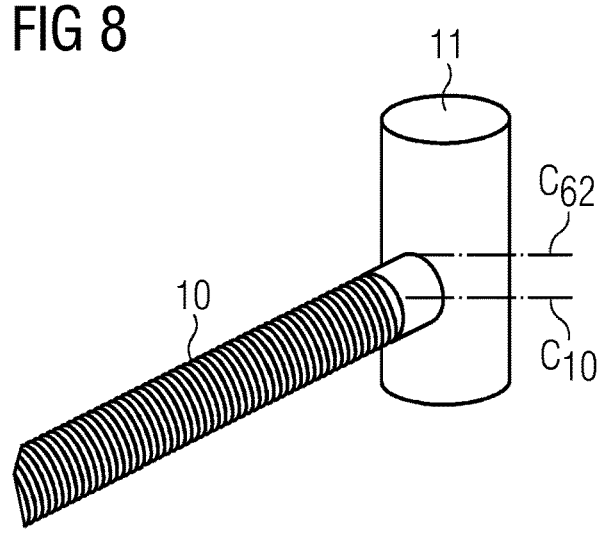
FIG. 8 shows a perspective view on a part of a T-bolt according to a design preferentially used for the root assembly of FIG. 4.

FIG. 8 shows a perspective view on a part of a T-bolt according to a design preferentially used for the root assembly 20 of FIG. 4 with the radially offset cavities 62. The T-bolt has a non-symmetric design, meaning that the attachment point of the bolt 10 at the bushing 11 is offset from a center or middle of the bushing 11. This is indicated by the radially offset centerlines $C_{10}$, $C_{62}$ showing the respective positioning of the bolt 10 and the bushing 11 in the root segment 61.

It has been found that for a radial offset of $0 \leq d_R/t \leq 0.08$, a very good strain reduction may be achieved. This means that the position of the centers of the cavities 62 or bolts 10 is shifted towards the inner surface of the wind turbine blade 5 by a distance less than or equal to 8% of the thickness t of the (laminate) material of the root portion 6 of the wind turbine blade 5. In other words, the second centerline $C_{10}$ is offset from the first centerline $C_{62}$ by an amount equal to or less than 8% of the thickness t of the root segment 61.

Figure 9:
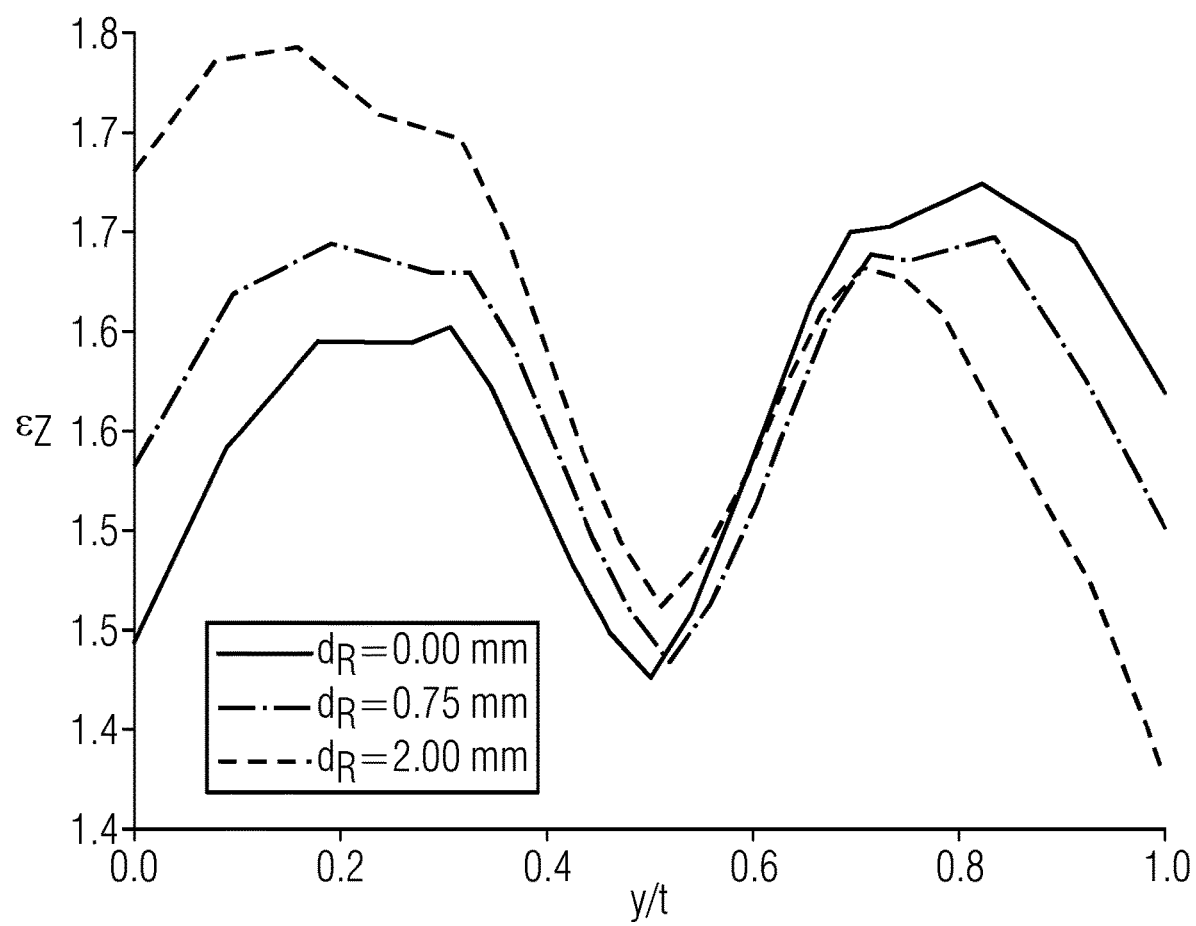
FIG. 9 shows a strain profile diagram for the wind turbine blade of FIG. 6.

FIG. 9 shows a diagram of the result of a simulation comparing normalized strain profiles $\varepsilon_Z$ adjacent to bushings through the through the thickness t (measured in the Y direction) of the laminate of the wind turbine blade 5 from the inside (surface) of the wind turbine blade 5 (Y/t=0) to the outside (surface) of the wind turbine blade 5 (Y/t=1). Three cases are illustrated in this diagram for the radial distance $d_R$, namely $d_R=0$ mm, $d_R=0.75$ mm and $d_R=2$ mm. The result of the last two is an equalization of the strain profile $\varepsilon_Z$ through the laminate and a reduction in overall strain $\varepsilon_Z$ in the root portion 6. A radial distance of $d_R=0.75$ mm delivers the best result. In lab-scale, the radial offset has proven to be most beneficial for $d_R=0.1$ to 0.3 mm. However, the exact radial distance $d_R$ that is most beneficial depends on the axial distance $d_A$ and the lateral distance $d_L$.

Figure 10:
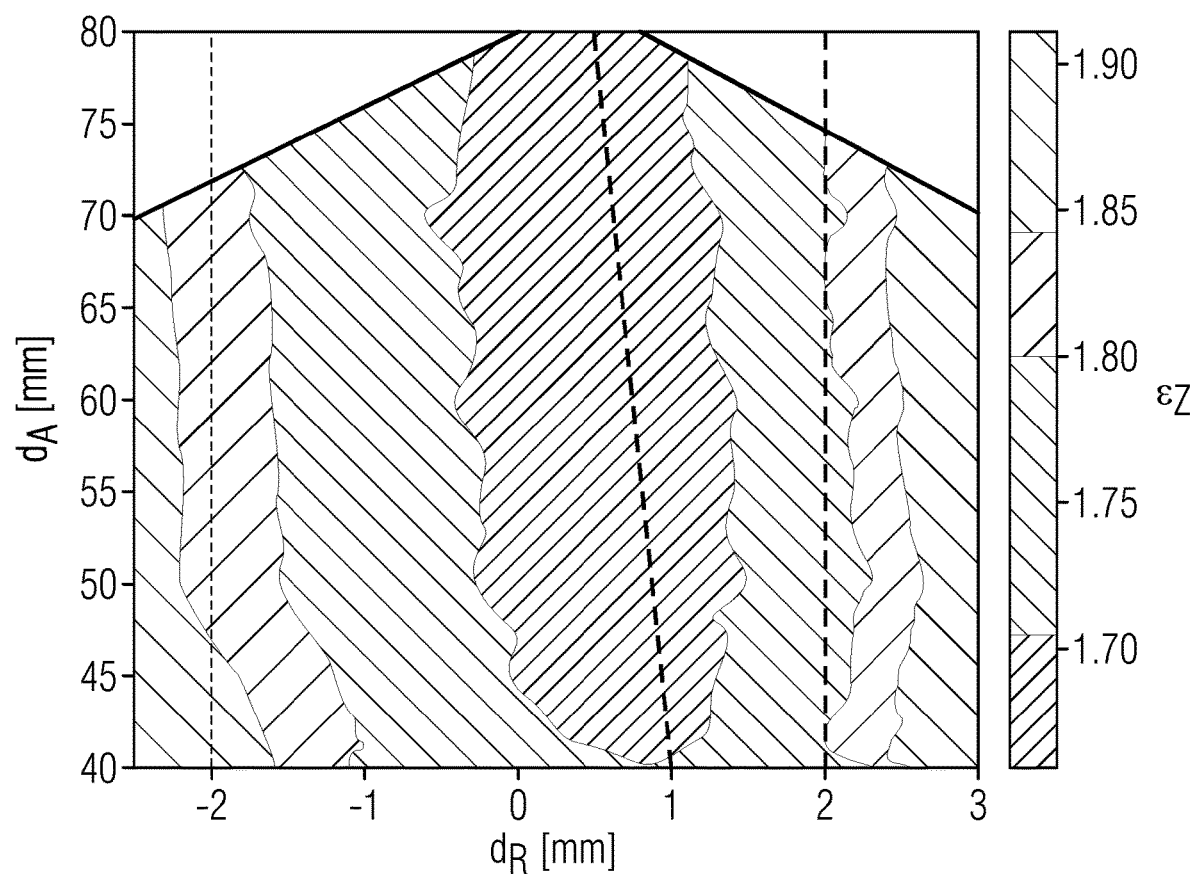
FIG. 10 shows a strain profile diagram for different combinations of radial distances between staggered rows of bolts and axial distances between the bushings.

This is explained in more detail with reference to FIG. 10 showing a diagram of maximum overall strains $\varepsilon_Z$ for different combinations of radial distances $d_R$ and axial distances $d_A$. In other words, FIG. 10 shows different design parameters of the root portion 6 and the overall strains $\varepsilon_Z$ resulting therefrom.

When evaluating exactly which radial distance $d_R$ to use as design parameter, the reduction of the strain in the laminate of the wind turbine blade 5 must be considered. This is why the design parameters radial distance $d_R$ and axial distance $d_A$ preferentially should be considered and chosen in combination. This is best illustrated in FIG. 10. Different combinations of radial distances $d_R$ and axial distances $d_A$ can be used in combination to achieve similarly low strain levels. The proposed radial offset of the T-bolts 5 can either reduce the maximum strain in the laminate or achieve equivalent strain values at a lower axial distance or spacing $d_A$. Both behaviors are achieved by equalizing the strain profile (as seen in FIG. 9), but different radial distances $d_R$ may be used to achieve them.

However, when a larger axial distance $d_A$ is not possible, it is possible to achieve a further strain reduction at a set axial distance $d_A$ or an equivalent strain performance at a lower axial distance $d_A$ by radially offsetting the two centerlines $C_{10}$, $C_{62}$ from one another.

Figure 11:
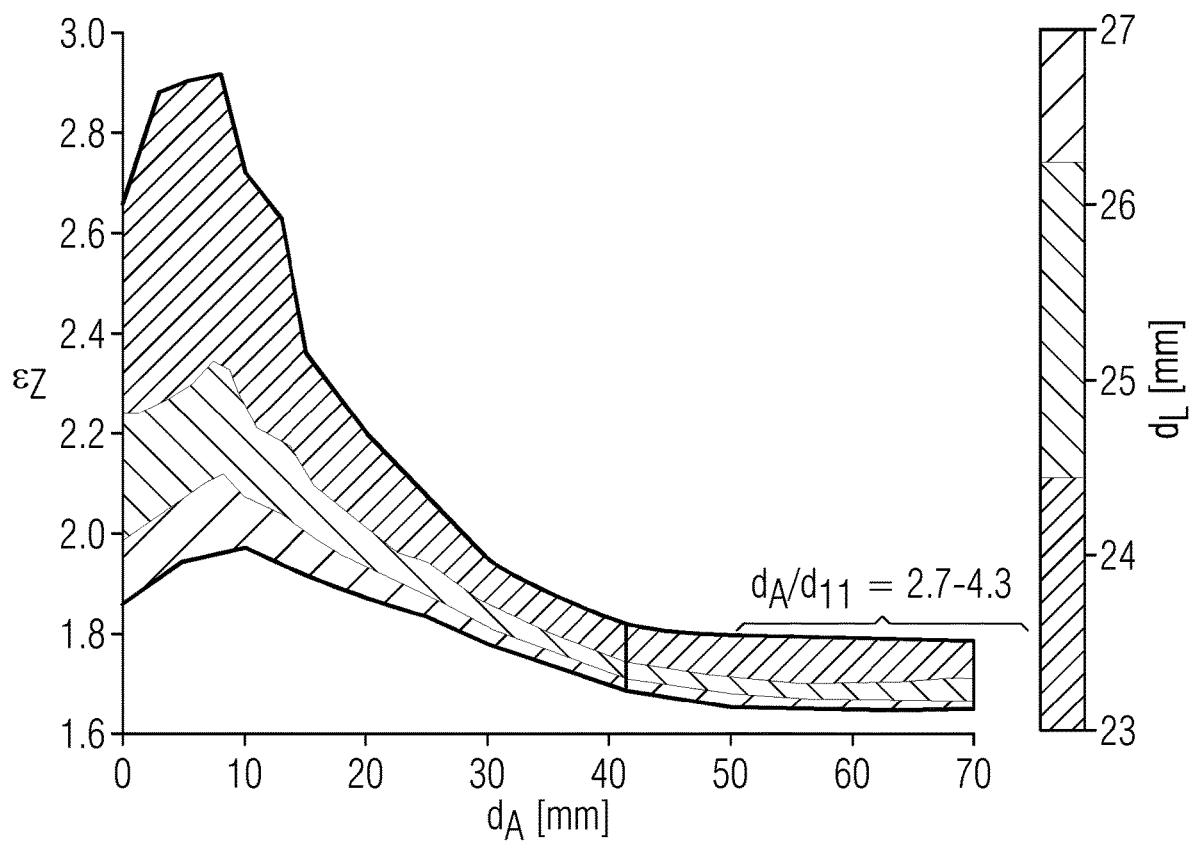
FIG. 11 shows a strain profile diagram depending on the axial distance of bushings and the lateral distance of bushings for a given bushing diameter.

FIG. 11 shows a diagram of numerical strain results $\varepsilon_Z$ depending on the axial distance $d_A$ and the lateral distance $d_L$ for a given bushing diameter $d_{11}$. A quotient range of 2.7 to 4.3 between the axial distance $d_A$ and the bushing diameter $d_{11}$ of the bushings 11 is indicated in the diagram of FIG. 11. With this quotient range, the distance between the two staggered rows S.1, S.2 of bushings 11 are increased to a region of optimal strain reduction as may be taken from the strain profile $\varepsilon_Z$ corresponding thereto.

The main advantage of the increased axial spacing between the adjacent bushings 11 is lower strain levels around the bolts 10. This creates two key advantages: firstly, the laminate of the root portion 6 can carry a higher load, and thus support longer wind turbine blade 5, and secondly, the bushings 11 can be spaced closer together (meaning laterally closing together or, in other words, reducing the lateral distance $d_L$), allowing for more bolts 10 around the circumference of the root portion 6, which also allows for stronger and/or longer wind turbine blades 5 by way of load loads per bolt 10.

FIG. 12 illustrates a top view on a strain contours representation of the part of the root segment 61 of FIG. 5 with a quotient of 2.3 between the axial distance $d_A$ and the bushing diameter $d_{11}$.

FIG. 13 on the other hand illustrates a top view on a strain contours representation of the part of the root segment 61 of FIG. 5 with a quotient of 4.3 between the axial distance $d_A$ and the bushing diameter $d_{11}$. The greater axial spacing of the bushings 11 significantly reduces the strain magnitude in the root segment 61 of FIG. 13 over the one of the root segment 61 of FIG. 12.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A root assembly of a wind turbine blade for a wind turbine, comprising:
   (a) a root portion of the root assembly including a root segment;
   (b) a root attachment face of the root portion attached to a bearing or a hub flange of the root assembly by multiple bolts;
   (c) each of the multiple bolts is connected to one of multiple bushings fixedly arranged within the root segment such that the multiple bolts are arranged adjacent to each other along a circumference of the root portion, and the multiple bushings are arranged adjacent to each other along the circumference of the root portion, and
   (d) adjacent bushings are offset from one another in a way such that the adjacent bushings are provided at an axial distance from one another, the axial distance being measured in an axial direction from the root attachment face to the multiple bushings and between centers of the adjacent bushings,
   wherein a quotient between the axial distance and a bushing diameter of the multiple bushings is 2.5 or greater;
   wherein the root segment has a first centerline located in a center of a thickness of the root segment measured along a radial direction of the root segment and extending along a circumferential direction of the root segment, the multiple bolts are arranged with centers along a second centerline extending along the circumferential direction of the root segment, and the second centerline is offset from the first centerline.

2. The root assembly according to claim 1, wherein, the quotient between the axial distance and the bushing diameter of the multiple bushings is in a range of 2.5 to 5.

3. The root assembly according to claim 1, wherein, the quotient between the axial distance and the bushing diameter of the multiple bushings is within a range of 2.7 to 4.8.

4. The root assembly according to claim 1, wherein, the quotient between the axial distance and the bushing diameter of the multiple bushings is within a range of 3 to 4.5.

5. The root assembly according to claim 1, wherein, the second centerline is offset from the first centerline in a direction towards an inside of the root portion.

6. The root assembly according to claim 1, wherein, the second centerline is offset from the first centerline by less than 15 of the thickness of the root segment.

7. The root assembly according to claim 1, wherein, the second centerline is offset from the first centerline by 0.5% to 5 of the thickness of the root segment.

8. The root assembly according to claim 1, wherein, the multiple bolts extend with the centers being offset from the first centerline along the first centerline.

9. The root assembly according to claim 1, wherein at least half of the multiple bolts of the root assembly are arranged with the centers along the second centerline.

10. The root assembly according to claim 1, wherein, the multiple bolts are secured against the bearing or the hub flange by nuts.

11. The root assembly according to claim 1, wherein, the multiple bolts have a first length or a second length, wherein the second length is greater than the first length, and wherein bolts of the multiple bolts having the first length and bolts of the multiple bolts having the second length are alternately connected to the adjacent bushings.

12. A wind turbine blade comprising the root assembly according to claim 1.

13. A wind turbine comprising at least one wind turbine blade according to claim 12.

\* \* \* \* \*